Figure 1:
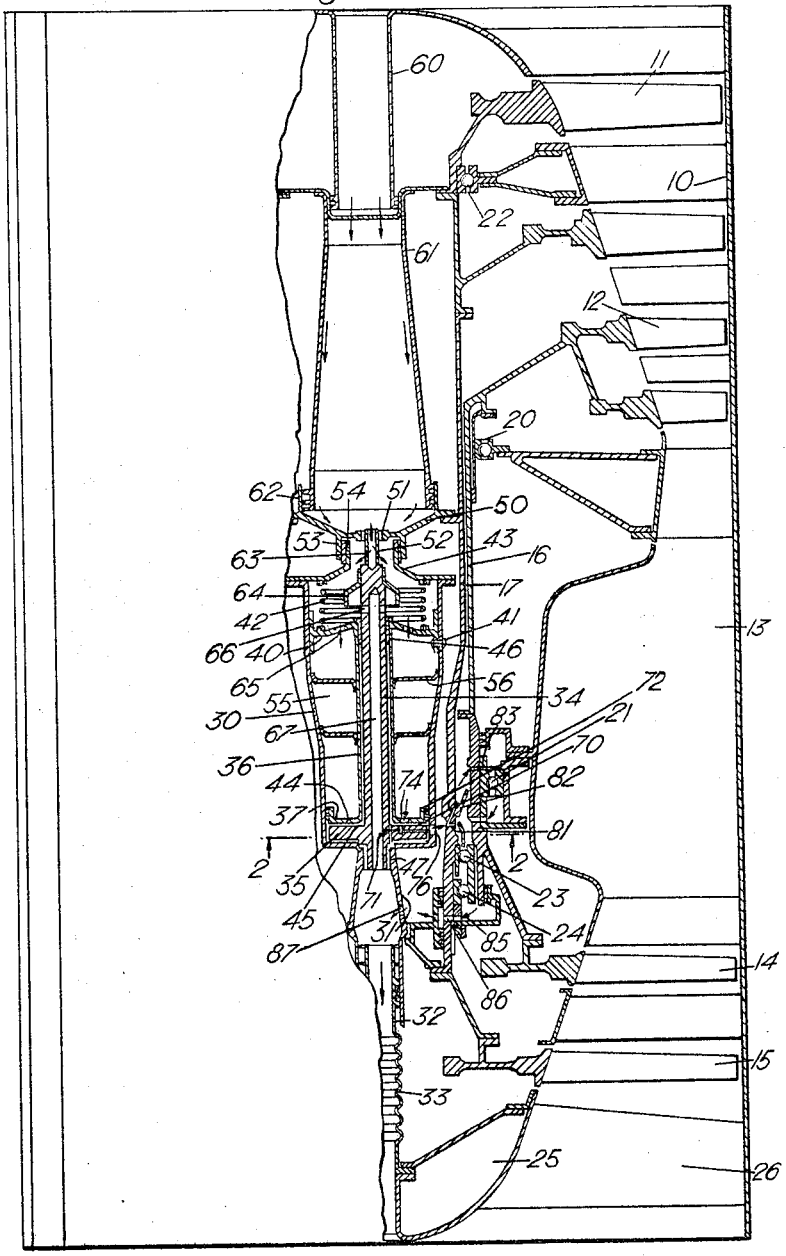

Nov. 15, 1966 E. T. HOPLEY 3,285,004
BEARING ASSEMBLY
Filed March 19, 1965 2 Sheets-Sheet 1

Inventor
Eric Trevor Hopley
By
Cushman, Darby & Cushman
Attorneys

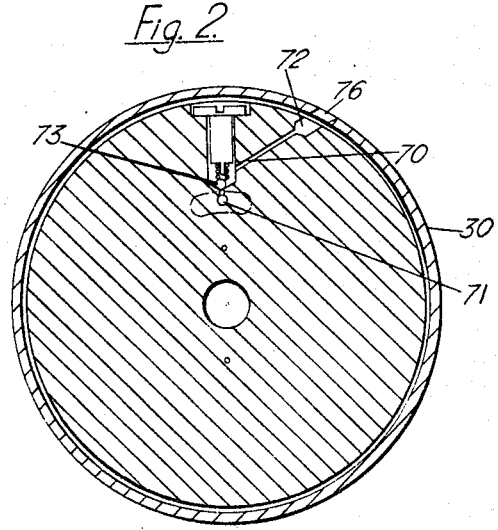

United States Patent Office 3,285,004
Patented Nov. 15, 1966

1

3,285,004
BEARING ASSEMBLY
Eric T. Hopley, Allestree, Derby, England, assignor to Rolls-Royce Limited, Derby, England, a company of Great Britain
Filed Mar. 19, 1965, Ser. No. 441,032
14 Claims. (Cl. 60—39.08)

This invention concerns a bearing assembly and, although it is not so restricted, it is more particularly concerned with a bearing assembly for a gas turbine engine.

According to the present invention, there is provided a bearing assembly comprising one or more bearings, a rotor member mounted internally of the bearing or bearings and having a passage therethrough, said passage having a lubricant inlet and a lubricant outlet which is disposed radially outwardly of the lubricant inlet, ducting, by means of which the lubricant outlet may communicate with the bearing or bearings, a stationary lubricant reservoir and means permitting communication between the lubricant reservoir, and the lubricant inlet and/or between the lubricant outlet and the ducting only when the rotor member is in a predetermined angular position or positions, whereby a quantity of lubricant is centrifugally forced through the said passage and passes to the bearing or bearings at each revolution of the rotor member.

The rotor member may have a surface which is provided with the lubricant inlet, the lubricant reservoir having a similarly shaped surface which is provided with an aperture which communicates with the lubricant inlet whenever the rotor member is in a said predetermined angular position, means being provided for resiliently urging the said surfaces against each other. The said passage preferably incorporates a valve which prevents lubricant from passing radially outwardly therethrough when the rotor member is stationary and/or until a predetermined rotational speed of the rotor member is attained.

The invention also comprises a gas turbine engine comprising an engine casing within which compressor means, combustion equipment and turbine means are arranged in flow series, and shafting on which the compressor means and turbine means are drivingly mounted, the shafting being mounted in the bearing or bearings of a bearing assembly as set forth above, the lubricant reservoir of the said bearing assembly being mounted within the shafting and the rotor member of the said bearing assembly being mounted within and driven by the shafting.

The engine may have a high pressure shaft on which are drivingly mounted a high pressure compressor and a high pressure turbine, and a low pressure shaft on which are drivingly mounted a low pressure compressor and a low pressure turbine, the low pressure shaft being mounted within the high pressure shaft and driving the said rotor member. In this case, there is preferably at least one intershaft bearing which is disposed between said low and high pressure shafts and which receives lubricant which has passed through the said passage in the rotor member.

It will be appreciated that the present invention is especially useful as providing a means of lubricating the said intershaft bearing or bearings.

Such bearings cannot be lubricated in the conventional manner, because of the absence of static structure immediately upstream of them through which a lubricant duct could pass, and because although static structure does exist immediately rearwardly of them, the high turbine exit temperature makes it extremely difficult to heat insulate a lubricant duct in this static structure.

If, however, the intershaft bearings are lubricated from a lubricant reservoir disposed within said shafting,

2 lubricant from said reservoir being centrifuged towards the intershaft bearings, it is important to ensure that the whole of the lubricant from the lubricant reservoir is not immediately centrifuged to the intershaft bearings once the engine is brought into operation. In the case of the present invention, however, only a small quantity of lubricant will be transferred from the lubricant reservoir to the intershaft bearings at each revolution of the rotor members.

The high pressure shaft is preferably mounted in a bearing which receives lubricant which has passed through the said passage in the rotor member.

The arrangement is preferably such that lubricant which has passed through the said bearing or bearings may pass to atmosphere. Thus, the engine may comprise a rotary sump chamber to which may drain lubricant which has passed through the said bearing or bearings, the rotary sump chamber being provided with one or more apertures communicating with atmosphere, lubricant in said sump chamber passing through the aperture or apertures therein only when not subjected to centrifugal force.

The invention is illustrated, merely by way of example, in the accompanying drawings, in which:

FIGURE 1 is a broken-away sectional view of a gas turbine engine provided with a bearing assembly according to the present invention, and FIGURE 2 is a section taken on the line 2—2 of FIGURE 1.

In the drawings there is shown a vertically mounted gas turbine vertical lift engine, i.e. an engine adapted to produce vertical lift forces on an aircraft independently of those generated aerodynamically by forward flight of the aircraft. The said engine has a thrust to weight ratio of at least 8:1 and preferably of at least 12:1. Thus, it may have a thrust to weight ratio of 16:1 or even more.

The engine has an engine casing 10 within which are mounted in flow series a low pressure compressor 11, a high pressure compressor 12, combustion equipment 13, a high pressure turbine 14, and a low pressure turbine 15.

The high pressure compressor 12 and the high pressure turbine 14 are drivingly mounted on a high pressure shaft 16. The low pressure compressor 11 and the low pressure turbine 15 are drivingly mounted on a low pressure shaft 17 which is itself mounted within the high pressure shaft 16.

The high pressure shaft 16 is mounted, adjacent its upper and lower ends, within bearings 20, 21 respectively. The low pressure shaft 17 is mounted adjacent its upper end in a bearing 22, the low pressure shaft 17 being mounted adjacent its lower end in intershaft bearings 23, 24, which are disposed between the shafts 16, 17.

Turbine exhaust gases which have passed through the turbines 14, 15 are directed to atmosphere through the downstream part of the engine casing 10. Mounted within the said downstream part is a substantially conical member 25 which is supported from the engine casing 10 by a plurality of angularly spaced apart struts 26.

Mounted within the low pressure shaft 17 is a cylindrical member 30 whose lower end has a reduced diameter portion 31. The portion 31 has a tube 32 splined within it, the tube 32 being secured to the conical member 25 by way of a convoluted torque tube 33. This construction ensures that the cylindrical member 30 cannot rotate but that accommodation will be provided for relative axial and radial movement between the cylindrical member 30 and the conical member 25 due to temperature differences.

Mounted within the cylindrical member 30 is a rotor shaft 34 which carries at its lower end a rotor disc 35.

The motor shaft 34 is mounted within a sleeve 36. The sleeve 36 is provided at its lower end with an annular piston 37 which is mounted within the cylindrical member 30. The sleeve 36 is provided at its upper end with an annular member 40 which is connected to the cylindrical member 30 by way of a connection 41 which permits axial sliding movement therebetween but which prevents relative rotation. A spring 42 extends between the upper surface of the annular member 40 and a cap member 43 which constitutes an end wall of the cylindrical member 30. The piston 37 and rotor disc 35 have similarly shaped planar surfaces 44, 45, respectively which are thus resiliently urged against each other by the spring 42.

The rotor shaft 34 is mounted adjacent its upper and lower ends in dry bearings 46, 47 respectively, the dry bearings 46, 47 being respectively carried by the sleeve 36 and by the portion 31 of the cylindrical member 30.

A wall member 50 is secured within and rotates with the low pressure shaft 17. The wall member 50 has a centrally disposed opening 51 within which is splined an upper end portion 52 of the rotor shaft 34. The wall member 50 has an axially extending annular flange 53 which is rotatably mounted on dry bearings 54 carried by the cap member 43.

The cylindrical member 30, piston 37, and sleeve 36 together define a stationary lubricant reservoir 55.

Mounted in the lubricant reservoir 55 are baffle plates 56. The baffle plates 56, which extend between the cylindrical member 30 and the sleeve 36, prevent lubricant within the lubricant reservoir 55 from splashing about therein.

Lubricant may be supplied to the lubricant reservoir 55 through a glass fibre tube 60 which extends to the intake end of the engine and which is telescopically mounted within a glass fibre tube 61. The tube 61 is mounted within an annular flange 62 of the wall member 50. Lubricant introduced through the upper end of the tube 60 flows downwardly along the path indicated by the arrows so as to pass through the upper end of the upper end portion 52 of the rotor shaft 34. The lubricant then passes through apertures 63 in the upper end portion 52 and so flows to the lubricant reservoir 55.

A baffle member 64, which is mounted on the rotor shaft 34, directs the lubricant which has passed through the apertures 63 to flow through apertures 65 in the wall member 40.

The rotor shaft 34 is provided, immediately below the baffle member 64 with spill holes 66. The portion of the rotor shaft 34 in which the spill holes 66 are provided extends outwardly of the sleeve 36, the spill holes 66 communicating with an axial duct 67 which extends through the rotor shaft 34. Thus excess lubricant above the level of the spill holes 66 in the lubricant reservoir 55 may escape by passing down the axial duct 67, and thence through the interiors of the portion 31, tube 32, and convoluted torque tube 33, to atmosphere.

The rotor disc 35 is provided with a mainly radial passage 70 therethrough. The passage 70 has a lubricant inlet 71 which is disposed in the planar surface 45 of the rotor disc 35. The passage 70 is also provided with a lubricant outlet 72 which is disposed radially outwardly of the lubricant inlet 71 and which is disposed in the curved periphery of the rotor disc 35.

The lubricant inlet 71 communicates with the main portion of the passage 70 by way of a non-return valve 73 (see FIGURE 2) which prevents lubricant from passing radially outwardly therethrough when the rotor shaft 34 is stationary and until a predetermined engine rotational speed is attained. It may be necessary to provide pockets near each bearing which retain a predetermined quantity of oil when the engine becomes stationary said quantity of oil serving to lubricate the bearing at low rotational speed until the valve 73 becomes opened due to centrifugal forces acting upon it.

The piston 37 is provided with an aperture 74 which communicates with the lubricant inlet 71 whenever the rotor disc 35 is in one particular angular position.

The cylindrical member 30 is provided with an aperture 76 which communicates with the lubricant outlet 72 whenever the rotor disc 35 is in a particular angular position.

It will therefore be appreciated that, during each revolution of the rotor disc 35, there will be a limited period during which the lubricant inlet 71 will communicate with the aperture 74 so as to receive lubricant therefrom, and there will also be a limited period during which the lubricant outlet 72 will communicate with the aperture 76 so as to permit the passage of lubricant through the latter. At each revolution of the rotor disc 35 there will therefore be a limited quantity of lubricant which will pass out through the aperture 76.

This limited quantity of lubricant is directed to pass through apertures 80, 81 in the low pressure shafts 17. Lubricant which has passed through the aperture 80 is centrifugally forced along a lip 82 and then flows via an aperture 83 in the high pressure shaft 16 to the bearing 21.

Lubricant which has passed through the aperture 81, together with lubricant which has passed through the bearing 21, flows to the intershaft bearings 23, 24 so as to lubricate the latter.

Lubricant which has passed through the bearings 23, 24 collects in a rotary sump chamber 85 which is carried by the low pressure shaft 17. The rotary sump chamber 85 has apertures 86 therein. Any lubricant passing out of the rotary sump chamber 85 may enter the interior of the portion 31 through one or more apertures 87 therein.

Lubricant which has passed through the aperture or apertures 87 will flow downwardly through the tube 32 and through the convoluted torque tube 33 so as to pass to atmosphere.

As will be appreciated, the disposition of the apertures 86 is such that, when the engine is in operation, centrifugal force will prevent any lubricant in the rotary sump chamber 85 from passing through the apertures 86. On the other hand, when the engine is shut down, and centrifugal forces are not operative, lubricant in the sump chamber 85 will pass to atmosphere through the apertures 86, 87.

It will thus be seen that the bearings 21, 23, 24 are not only lubricated from a lubricant reservoir 55 which is disposed within the shafts 16, 17 whereby lubrication of these bearings does not involve the use of ducts crossing the main annular flow duct of the engine, but also these bearings are provided with a metered flow of lubricant over a substantial period. That is to say, the lubricant reservoir 55 can be filled with an appropriate quantity of lubricant which will provide ample lubrication throughout the whole period in which the vertical lift engine may be expected to be in use, only small quantities of lubricant being forced out of the lubricant reservoir 55 at each revolution of the rotor disc 35.

The provision of a lubricant reservoir 55 within the shafts 16, 17 also enables the exterior of the vertical lift engine to be kept "clean," that is to say free from protuberances.

Since the piston 37 is forced by the spring 42 against the rotor disc 35, there is little risk that lubricant will leak from the lubricant reservoir 55 when the engine is stationary. Even if the aperture 70 communicates with the lubricant inlet 71 when the engine is stationary, there should be no leakage of lubricant from the lubricant reservoir 55 since such leakage will be prevented by the non-return valve 73.

I claim:
1. A bearing assembly comprising at least one bearing, a rotor member mounted internally of the bearing and having a passage therethrough, said passage having a lubricant inlet and a lubricant outlet which is disposed radially outwardly of the lubricant inlet, ducting, by means of which the lubricant outlet may communicate with the bearing, a stationary lubricant reservoir, and means including said passage permitting lubricant to pass from the lubricant reservoir to the ducting only when the rotor member is in at least one predetermined angular position, whereby a quantity of lubricant is centrifugally forced through the said passage and passes to the bearing at each revolution of the rotor member.

2. A bearing assembly comprising at least one bearing, a rotor member mounted internally of the bearing and having a passage therethrough said passage having a lubricant inlet which is provided at a surface of the rotor and a lubricant outlet which is disposed radially outwardly of the lubricant inlet, ducting, by means of which the lubricant outlet may communicate with the bearing, a stationary lubricant reservoir having a surface shaped similarly to the said rotor surface and provided with an aperture which communicates with the lubricant inlet whenever the rotor member is in a predetermined angular position, and means for resiliently urging the said surfaces against each other, whereby a quantity of lubricant is centrifugally forced through the said passage and passes to the bearing at each revolution of the rotor member.

3. A bearing assembly comprising at least one bearing, a rotor member mounted internally of the bearing and having a passage therethrough, said passage having a lubricant inlet and a lubricant outlet which is disposed radially outwardly of the lubricant inlet, ducting, by means of which the lubricant outlet may communicate with the bearing, a stationary lubricant reservoir, means including said passage permitting lubricant to pass from the lubricant reservoir to the ducting only when the rotor member is in at least one predetermined angular position and a valve in said passage which prevents lubricant from passing radially outwardly therethrough until a predetermined rotational speed of the rotor member is attained, whereby a quantity of lubricant is centrifugally forced through the said passage and passes to the bearing at each revolution of the rotor member.

4. A bearing assembly comprising at least one bearing, a rotor disc mounted internally of the bearing and having a passage therethrough, said passage having a lubricant inlet which is disposed in one of the planar surfaces of the disc and a lubricant outlet which is disposed in the curved periphery of the disc, ducting, by means of which the lubricant outlet may communicate with the bearing, a stationary lubricant reservoir, and means including said passage permitting lubricant to pass from the lubricant reservoir to the ducting only when the rotor disc is in at least one predetermined angular position, whereby a quantity of lubricant is centrifugally forced through the said passage and passes to the bearing at each revolution of the rotor disc.

5. A bearing assembly comprising at least one bearing, a rotor disc mounted internally of the bearing and having a passage therethrough, said passage having a lubricant inlet which is disposed in one of the planar surfaces of the disc and a lubricant outlet which is disposed in the curved periphery of the disc, ducting, by means of which the lubricant outlet may communicate with the bearing, a stationary lubricant reservoir having a planar surface which is provided with an aperture which communicates with the lubricant inlet whenever the rotor disc is in a predetermined angular position, and means for resiliently urging the said planar surfaces against each other, whereby a quantity of lubricant is centrifugally forced through the said passage and passes to the bearing at each revolution of the rotor disc.

6. A bearing assembly as claimed in claim 5 in which the disc is carried by a rotor shaft which is disposed within the lubricant reservoir and is mounted within a sleeve, the sleeve being provided at one end with an annular piston which is mounted within a cylinder and which forms the lubricant reservoir therewith the piston being provided with the said aperture and being urged by a spring into contact with the disc.

7. A bearing assembly as claimed in claim 6 in which the rotor shaft has a portion which extends outwardly of the sleeve and which is provided with a spill hole, the spill hole communicating with an axial duct which extends through said rotor shaft and through which excess lubricant in the lubricant reservoir may escape.

8. A gas turbine engine comprising an engine casing, compressor means, combustion equipment, and turbine means arranged in flow series within said engine casing, shafting on which the compressor means and turbine means are drivingly mounted, a bearing within which the shafting is mounted, a rotor member mounted internally of the bearing, the rotor member being mounted within and driven by the shafting and having a passage therethrough, said passage having a lubricant inlet and a lubricant outlet which is disposed radially outwardly of the lubricant inlet, ducting, by means of which the lubricant outlet may communicate with the bearing, a stationary lubricant reservoir mounted within said shafting and means including said passage permitting lubricant to pass from the lubricant reservoir to the ducting only when the rotor member is in at least one predetermined angular position, whereby a quantity of lubricant is centrifugally forced through the said passage and passes to the bearing at each revolution of the rotor member.

9. An engine as claimed in claim 8 in which the engine has a high pressure shaft on which are drivingly mounted a high pressure compressor and a high pressure turbine, and a low pressure shaft on which are drivingly mounted a low pressure compressor and a low pressure turbine, the low pressure shaft being mounted within the high pressure shaft and driving the said rotor member.

10. An engine as claimed in claim 9 in which there is at least one intershaft bearing which is disposed between said low and high pressure shafts and which receives lubricant which has passed through the said passage in the rotor member.

11. An engine as claimed in claim 9 in which the high pressure shaft is mounted in a bearing which receives lubricant which has passed through the said passage in the rotor member.

12. A gas turbine engine comprising an engine casing, compressor means, combustion equipment, and turbine means arranged in flow series within said engine casing, shafting on which the compressor means and turbine means are drivingly mounted, a bearing within which the shafting is mounted, a rotor member mounted internally of the bearing, the rotor member being mounted within and driven by the shafting and having a passage therethrough, said passage having a lubricant inlet and a lubricant outlet which is disposed radially outwardly of the lubricant inlet, ducting, by means of which the lubricant outlet may communicate with the bearing, a stationary lubricant reservoir mounted within said shafting and means including said passage permitting lubricant to pass from the lubricant reservoir to the ducting only when the rotor member is in at least one predetermined angular position, lubricant which has passed through the said bearing passing to atmosphere, whereby a quantity of lubricant is centrifugally forced through the said passage and passes to the bearing at each revolution of the rotor member.

13. A gas turbine engine comprising an engine casing, compressor means, combustion equipment, and turbine means arranged in flow series within said engine casing, shafting on which the compressor means and turbine means are drivingly mounted, a bearing within which the shafting is mounted, a rotor member mounted internally of the bearing, the rotor member being mounted within and driven by the shafting and having a passage therethrough, said passage having a lubricant inlet and a lubricant outlet which is disposed radially outwardly of the lubricant inlet, ducting, by means of which the lubricant outlet may communicate with the bearing, a stationary lubricant reservoir mounted within said shafting and means including said passage permitting lubricant to pass from the lubricant reservoir to the ducting only when the rotor member is in at least one predetermined angular position, whereby a quantity of lubricant is centrifugally forced through the said passage and passes to the bearing at each revolution of the rotor member and a rotary sump chamber to which may drain lubricant which has passed through the said bearing, the rotary sump chamber being provided with at least one aperture communicating with atmosphere, lubricant in said sump chamber passing through the aperture therein only when unsubjected to centrifugal force.

14. An engine as claimed in claim 12 in which the engine is vertically mounted.

References Cited by the Examiner
UNITED STATES PATENTS

| | | | |
|---|---|---|---|
| 2,712,478 | 7/1955 | Carroll | 308—187 X |
| 2,866,522 | 12/1958 | Morley et al. | 60—39.08 X |
| 2,999,000 | 9/1961 | Spat | 308—187 |

MARK NEWMAN, *Primary Examiner.*

C. R. CROYLE, *Assistant Examiner.*